(12) United States Patent
Ii et al.

(10) Patent No.: US 11,441,774 B2
(45) Date of Patent: Sep. 13, 2022

(54) METHOD FOR OPERATING FLUE GAS PURIFICATION SYSTEM

(71) Applicant: MITSUBISHI HITACHI POWER SYSTEMS, LTD., Yokohama (JP)

(72) Inventors: Shinya Ii, Yokohama (JP); Akira Hirota, Yokohama (JP); Satoru Shishido, Yokohama (JP); Katsuhiro Yashiro, Yokohama (JP); Hiroyuki Yoshimura, Yokohama (JP); Nobuaki Shimizu, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 169 days.

(21) Appl. No.: 16/611,652

(22) PCT Filed: May 11, 2017

(86) PCT No.: PCT/JP2017/017955
§ 371 (c)(1),
(2) Date: Nov. 7, 2019

(87) PCT Pub. No.: WO2018/207332
PCT Pub. Date: Nov. 15, 2018

(65) Prior Publication Data
US 2020/0149741 A1    May 14, 2020

(51) Int. Cl.
*F23J 15/00* (2006.01)
*B01D 53/94* (2006.01)
*F23C 1/02* (2006.01)
*B01D 53/86* (2006.01)
*F23L 15/02* (2006.01)

(52) U.S. Cl.
CPC ........ *F23J 15/003* (2013.01); *B01D 53/8631* (2013.01); *B01D 53/8696* (2013.01);
(Continued)

(58) Field of Classification Search
None
See application file for complete search history.

(56) References Cited

U.S. PATENT DOCUMENTS 4,353,207 A * 10/1982 Lee ................... B01D 53/8631
60/39.182
4,820,492 A * 4/1989 Wada ..................... F01N 3/208
422/111

(Continued)

FOREIGN PATENT DOCUMENTS

JP      60-255523 A     12/1985
JP      61-98523 U      6/1986
(Continued)

OTHER PUBLICATIONS

International Search Report dated Aug. 1, 2017, issued in counterpart International Application No. PCT/JP2017/017955(2 pages).

*Primary Examiner* — David J Laux
(74) *Attorney, Agent, or Firm* — WHDA, LLP

(57) ABSTRACT

A method for operating a flue gas purification system, comprising, in the flue gas purification system, equipped with a boiler which can burn oil fuel and coal fuel either simultaneously or switching therebetween, a denitration equipment having a reducing agent injector and a catalytic reactor, an inlet flue to guide flue gas discharged from the boiler to the denitration equipment, an outlet flue to guide flue gas discharged from the denitration equipment, a bypass flue which can guide flue gas from the inlet flue to the outlet flue so as to bypass the denitration equipment, and a bypass damper, opening the bypass damper and burning oil fuel in the boiler being in condition not yet suitable for coal combustion to allow the flue gas discharged from the boiler to dividedly flow to the denitration equipment and the bypass flue, switching the oil fuel to coal fuel when the boiler is in condition suitable for coal combustion to burn the (Continued)

coal fuel in the boiler, closing the bypass damper after switching the oil fuel to the coal fuel, and then injecting a reducing agent when the catalytic reactor is in condition suitable for a denitration reaction.

7 Claims, 2 Drawing Sheets

(52) U.S. Cl.
CPC ............ *B01D 53/9431* (2013.01); *F23C 1/02* (2013.01); *F23J 15/006* (2013.01); *B01D 2258/0283* (2013.01); *F23J 2219/10* (2013.01); *F23J 2900/11001* (2013.01); *F23L 15/02* (2013.01); *F23N 2237/20* (2020.01)

(56) References Cited

U.S. PATENT DOCUMENTS

| | | | |
|---|---|---|---|
| 5,275,554 A | 1/1994 | Faulkner | |
| 5,603,215 A * | 2/1997 | Sung | F01N 3/2006 |
| | | | 60/274 |
| 5,653,105 A * | 8/1997 | Noirot | B01D 53/9481 |
| | | | 422/169 |
| 5,943,865 A * | 8/1999 | Cohen | F22B 37/008 |
| | | | 60/653 |
| 2007/0081936 A1* | 4/2007 | Maziuk | B01D 53/508 |
| | | | 423/244.08 |

FOREIGN PATENT DOCUMENTS

| | | |
|---|---|---|
| JP | 62-106825 A | 5/1987 |
| JP | 62-186926 A | 8/1987 |
| JP | 5-340238 A | 12/1993 |
| JP | 7-75717 A | 3/1995 |
| JP | 10-159542 A | 6/1998 |
| JP | 2001-129353 A | 5/2001 |
| JP | 2003-080035 A | 3/2003 |
| JP | 2006-125808 A | 5/2006 |
| JP | 2006-162208 A | 6/2006 |
| JP | 2007-314139 A | 12/2007 |
| KR | 2011-0026234 A | 3/2011 |
| KR | 2018-0009264 A | 1/2018 |

\* cited by examiner

METHOD FOR OPERATING FLUE GAS PURIFICATION SYSTEM

TECHNICAL FIELD

The present invention relates to a method for operating a flue gas purification system. More specifically, the present invention relates to a method for operating a flue gas purification system, which can inhibit unburned combustible contents of oil fuel from adhering to a denitration catalyst at the boiler startup by oil combustion as well as can increase temperature of a denitration equipment more uniformly in a shorter time.

BACKGROUND ART

In thermal power plants, the daily start stop (DDS) operation, the weekly start stop (WSS) operation or the like is carried out depending on electric demand. Since coal has low combustibility, when the conditions such as the internal temperature of a boiler furnace are not right, coal cannot be sufficiently burned. Therefore, in a coal fired boiler, oil fuel with high combustibility such as light oil or heavy oil is fed to the boiler furnace to start combustion, and oil fuel can be switched to coal fuel when the conditions such as the internal temperature of the boiler furnace are right for coal combustion (e.g. Patent Documents 1 and 2).

In a denitration equipment by ammonia catalytic reduction (SCR), when exhaust gas into which ammonia ($NH_3$) is injected is gotten through a catalyst at a temperature of 250 to 450° C., NOx reacts with the $NH_3$ to be decomposed into harmless nitrogen and water vapor. In the denitration equipment shortly after the startup, however, $NO_x$ reduction reaction can proceed weakly because the temperature of catalytic layers is low. In addition, moisture contained in the exhaust gas can build up condensation in the catalytic layers, leading to degradation of the catalyst.

Patent Document 3, therefore, discloses a method for reducing nitrogen oxides in flue gas, the method being characterized in that in a method for removing nitrogen oxides by allowing flue gas discharged from a combustion equipment to pass through an ammonia reduction denitration equipment, a bypass flue having an ozone oxidation equipment and a nitrogen oxide adsorption equipment installed therein is set in a flow channel for treated gas discharged from the ammonia reduction denitration equipment, in a period when the ammonia reduction denitration equipment is not sufficiently worked, for example, shortly after the combustion equipment startup, treated gas remaining unreacted nitrogen oxides discharged from the denitration equipment is allowed to pass through the bypass flue, NO in the treated gas is oxidized into $NO_2$ and/or $N_2O_5$, and followed by adsorption treatment to remove the unreacted nitrogen oxides, and in a period when the ammonia reduction denitration equipment is sufficiently worked, the bypass flue is closed.

In addition, Patent Document 4 discloses, as a measure against e.g. condensation, a denitration equipment characterized in that an inlet flue to guide untreated gas to the denitration equipment and an outlet flue to guide treated gas are connected to an equipment for removing nitrogen oxides using ammonia fed from an ammonia injection pipe, a circulation duct is set in at least one of the inlet flue and outlet flue, and a dehumidification means to remove moisture in the flues is placed in the middle of the circulation duct.

CITATION LIST

Patent Literatures

Patent Document 1: JP 2006-125808 A
Patent Document 2: JP 2006-162208 A
Patent Document 3: JP H07-75717 A
Patent Document 4: JP S62-106825 A

SUMMARY OF THE INVENTION

Problems to be Solved by the Invention

In operation by switching oil fuel to coal fuel, flue gas can contain unburned combustible contents at the time of oil combustion. In a case where the unburned combustible contents adhere to the surface of a catalyst, if appropriate response is not made, a bad effect can be caused on the catalyst. Therefore, an operation can be carried out in which flue gas is not allowed to pass through catalytic layers during oil combustion, and the flue gas is allowed to pass through the catalytic layers after switching oil combustion to coal combustion. In this operation, since the temperature of flue gas when switching oil combustion to coal combustion is relatively high, a denitration equipment is rapidly heated when the flue gas begins flowing to the denitration equipment to produce a large thermal difference in the denitration equipment, which can cause damage to the catalyst, ducts or the like. It is conceivable that the amount of flue gas flowing to the catalytic layers is gradually increased so that a rapid increase in temperature will not be caused; however, a special mechanism for flow adjustment is required and also the SCR startup can be delayed.

An object of the present invention is to provide a method for operating a flue gas purification system, which can inhibit unburned combustible contents of oil fuel from adhering to a denitration catalyst at the boiler startup by oil combustion as well as can increase the temperature of a denitration equipment more uniformly in a shorter time.

Means for Solving the Problems

Studies for solving the above problems have resulted in completion of the present invention including the following aspects.

[1] A method for operating a flue gas purification system equipped with a boiler which can burn oil fuel and coal fuel either in combination or switching therebetween, a denitration equipment having a reducing agent injector and a catalytic reactor, an inlet flue to guide flue gas discharged from the boiler to the denitration equipment, an outlet flue to guide flue gas discharged from the denitration equipment, a bypass flue which can guide flue gas from the inlet flue to the outlet flue so as to bypass the denitration equipment, and a bypass damper, comprising: in the flue gas purification system,
opening the bypass damper and burning oil fuel in the boiler which is in condition not yet suitable for coal combustion to allow the flue gas discharged from the boiler to dividedly flow to the denitration equipment and the bypass flue,
switching the oil fuel to coal fuel when the boiler is in condition suitable for coal combustion to burn the coal fuel in the boiler,
closing the bypass damper after switching the oil fuel to the coal fuel, and then
injecting a reducing agent when the catalytic reactor is in condition suitable for a denitration reaction.

[2] The method according to [1], wherein the bypass damper is driven by a pneumatic actuator.
[3] The method according to [1], wherein the bypass damper is an on-off control damper.
[4] The method according to [1], wherein a proportion of the flue gas dividedly flowing to the denitration equipment and the bypass flue is 5:95 to 40:60.

Advantageous Effects of the Invention

According to the method of the present invention, the adhesion of unburned combustible contents of oil fuel to a denitration catalyst at the boiler startup by oil combustion can be inhibited as well as the temperature of a denitration equipment can be uniformly increased in a short time compared to conventional operation methods. Since the temperature of the denitration equipment can be uniformly increased, a strain in each part of the denitration equipment, nonuniformity of denitration reaction and other problems which can be caused due to a temperature difference, can be reduced. Since the temperature of the denitration equipment can be increased in a short time, the denitration treatment of flue gas can be started without much delay from the boiler startup.

EMBODIMENTS FOR CARRYING OUT THE INVENTION

Embodiments of the present invention will be described in detail based on the drawings. It should be noted that the scope of the present invention is not restricted to the following embodiments.

Figure 1:
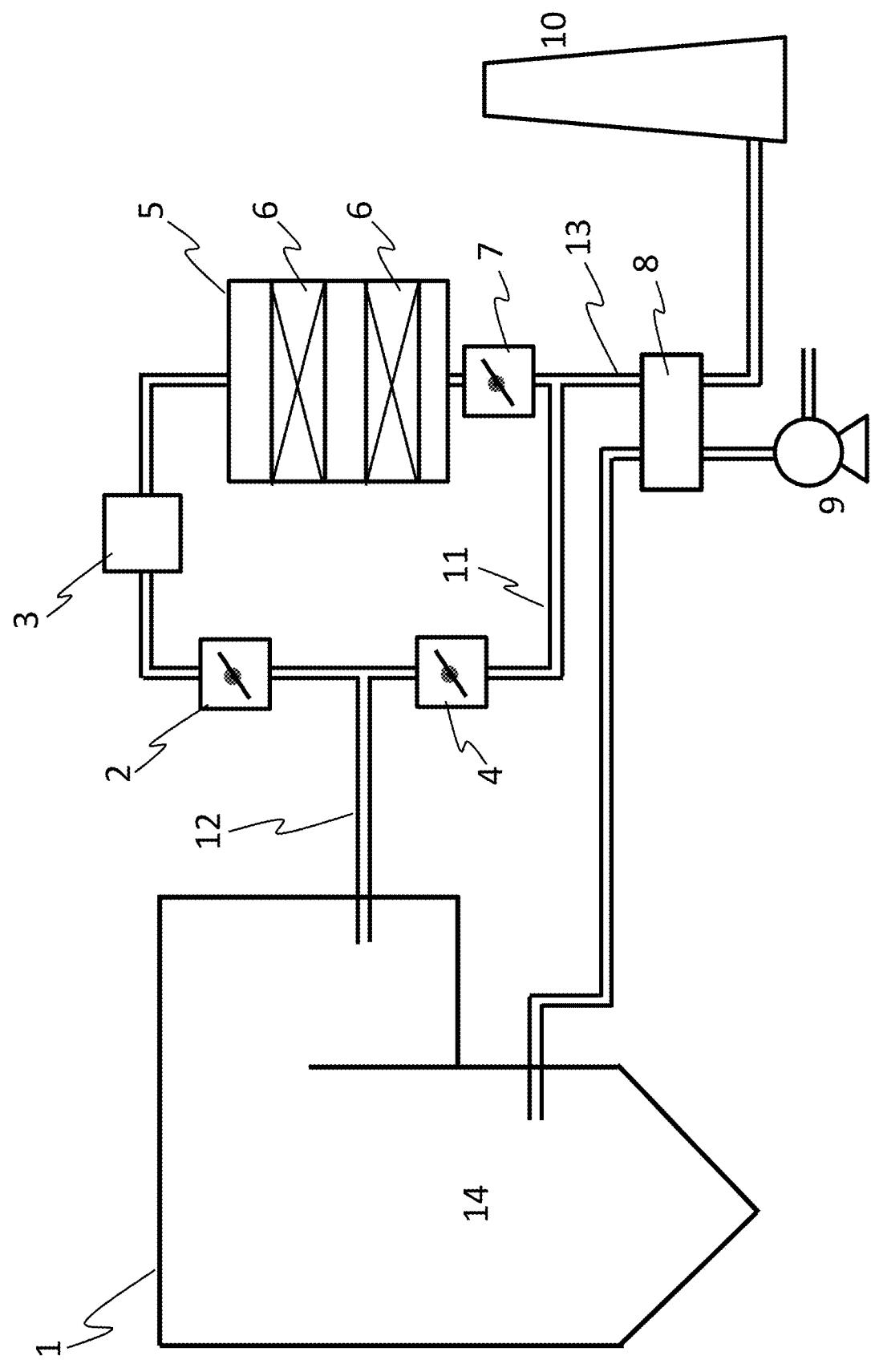
FIG. 1 is a schematic diagram which shows an example of a flue gas purification system.

The flue gas purification system as shown in FIG. 1 is equipped with a boiler 1 which can burn oil fuel and coal fuel either in combination or switching therebetween, a denitration equipment having a reducing agent injector 3 and a catalytic reactor 5, an inlet flue 12 to guide flue gas discharged from the boiler 1 to the denitration equipment, an outlet flue 13 to guide flue gas discharged from the denitration equipment, a bypass flue 11 which can guide flue gas from the inlet flue to the outlet flue so as to bypass the denitration equipment, and a bypass damper 4.

In the flue gas purification system shown in FIG. 1, air is fed through an induced draft fan 9 and a preheater 8 to a boiler furnace 14. Oil fuel or coal fuel is fed to a burner, and they are burned in the furnace 14. High temperature combustion gas obtained in the furnace passes through a superheater, a reheater, an economizer and the like through a convective heat transfer section. The combustion gas used in the boiler is discharged from the boiler as flue gas and conducted to an inlet flue 12. The flue gas may pass through a cooling tower, an alkali spray tower, a bagfilter (dust collector) or/and other equipments after discharged from the boiler 1 before conducted to the inlet flue 12.

The denitration equipment has a reducing agent injector 3 and a catalytic reactor 5. In the reducing agent injector 3, a reducing agent such as ammonia is injected into the inlet flue 12. A mixed gas of the flue gas and the reducing agent is conducted to the catalytic reactor 5 in which catalytic layers 6 are installed. When the mixed gas is brought into contact with the catalytic layers 6 at a predetermined temperature (e.g. 250 to 450° C.), the $NO_x$ reduction reaction proceeds. However, shortly after the boiler startup, the temperature of the catalytic layers is still low, and the $NO_x$ reduction reaction does not proceed well even when the reducing agent is injected. In addition, in a case where ammonia is injected at low temperature, the formation reaction of ammonium sulfate and the like can be dominant compared to the $NO_x$ reduction reaction. The denitration equipment is heated by thermal energy of the flue gas, and the temperature of the catalytic layers is increased. However, rapid heating can causes temperature ununiformity, which can cause problems such as a strain in each part of the denitration equipment. In the present invention, the temperature of the denitration equipment can be uniformly increased in a short time by a method described below.

The flue gas which has passed through the catalytic reactor is conducted to the outlet flue 13. The thermal energy of the flue gas can be also used to warm air in an air preheater 8. The flue gas can be released to the atmosphere through a stack 10. An electric dust collector, a desulfurization equipment, a $CO_2$ removal equipment or/and other equipments may be further installed between the outlet flue 13 and the stack 10. In the system shown in FIG. 1, dampers 2, 7 are installed in the inlet and outlet of the denitration equipment respectively, however, if the amount of flue gas passing through the denitration equipment can be adjusted by the bypass damper 4, it is not required to install the dampers 2, 7. The inlet damper 2 of the denitration equipment and the outlet damper 7 of the denitration equipment are preferably driven by an electric actuator. In addition, the inlet damper 2 of the denitration equipment and the outlet damper 7 of the denitration equipment are preferably a proportional control damper. The amount of flue gas passing through the denitration equipment can be adjusted by changing the opening of the inlet damper 2 of the denitration equipment or the outlet damper 7 of the denitration equipment.

The bypass flue 11 is a flow channel which can guide the flue gas from the inlet flue 12 to the outlet flue 13 to bypass the denitration equipment. The bypass damper 4 is installed in the bypass flue 11. The bypass damper 4 is preferably driven by a pneumatic actuator. In addition, the bypass damper 4 is preferably an on-off control damper.

In the method of the present invention, first, the bypass damper 4, the inlet damper 2 of the denitration equipment, and the outlet damper 7 of the denitration equipment are opened in a flue gas purification system. Then, oil fuel is burned in a boiler furnace 14. In the boiler at the startup, the furnace 14 has low temperature and has not yet been suitable for coal combustion. Oil fuel has high combustibility and can be burned even at low temperature. However, flue gas generated by oil combustion at low temperature can contain unburned combustible contents (such as oil mist), which have a risk to deteriorate a denitration catalyst. In the method of the present invention, the flue gas discharged from the boiler is allowed to dividedly flow to the denitration equipment and a bypass flue during the oil combustion. By doing this, both of inhibiting a deterioration of the denitration catalyst due to unburned combustible contents in the flue gas and promoting a temperature increase of the denitration equipment by thermal energy of the flue gas can be achieved. The ratio of the amount of flue gas flowing through the bypass flue to the amount of flue gas flowing through the denitration equipment is preferably 60/40 to 95/5, and more preferably 70/30 to 90/10.

When the boiler furnace has an increased temperature and has been suitable for coal combustion, coal fuel is burned in the boiler furnace by switching the oil fuel to the coal fuel. After switching the oil fuel to the coal fuel, the bypass damper 4 is closed. This allows that almost all the flue gas flows into the denitration equipment and a temperature increase of the denitration equipment is further promoted. While the temperature of the catalytic layers is lower than a predetermined value (e.g. 250° C., etc.), the $NO_x$ reduction reaction does not sufficiently proceed even injecting ammonia, and side reactions such as the formation reaction of ammonium sulfate easily proceed.

Next, when the catalytic reactor has been suitable for the denitration reaction, a reducing agent begins to be injected. According to the method of the present invention, the time from the boiler startup to the start of injection of the reducing agent, i.e. from the boiler startup to the start of $NO_x$ reduction reaction can be greatly reduced compared to the conventional methods.

Effects obtained by the operation method of the present invention will be described in more detail by way of Examples and Comparative Examples as below.

Example 1

Figure 2:
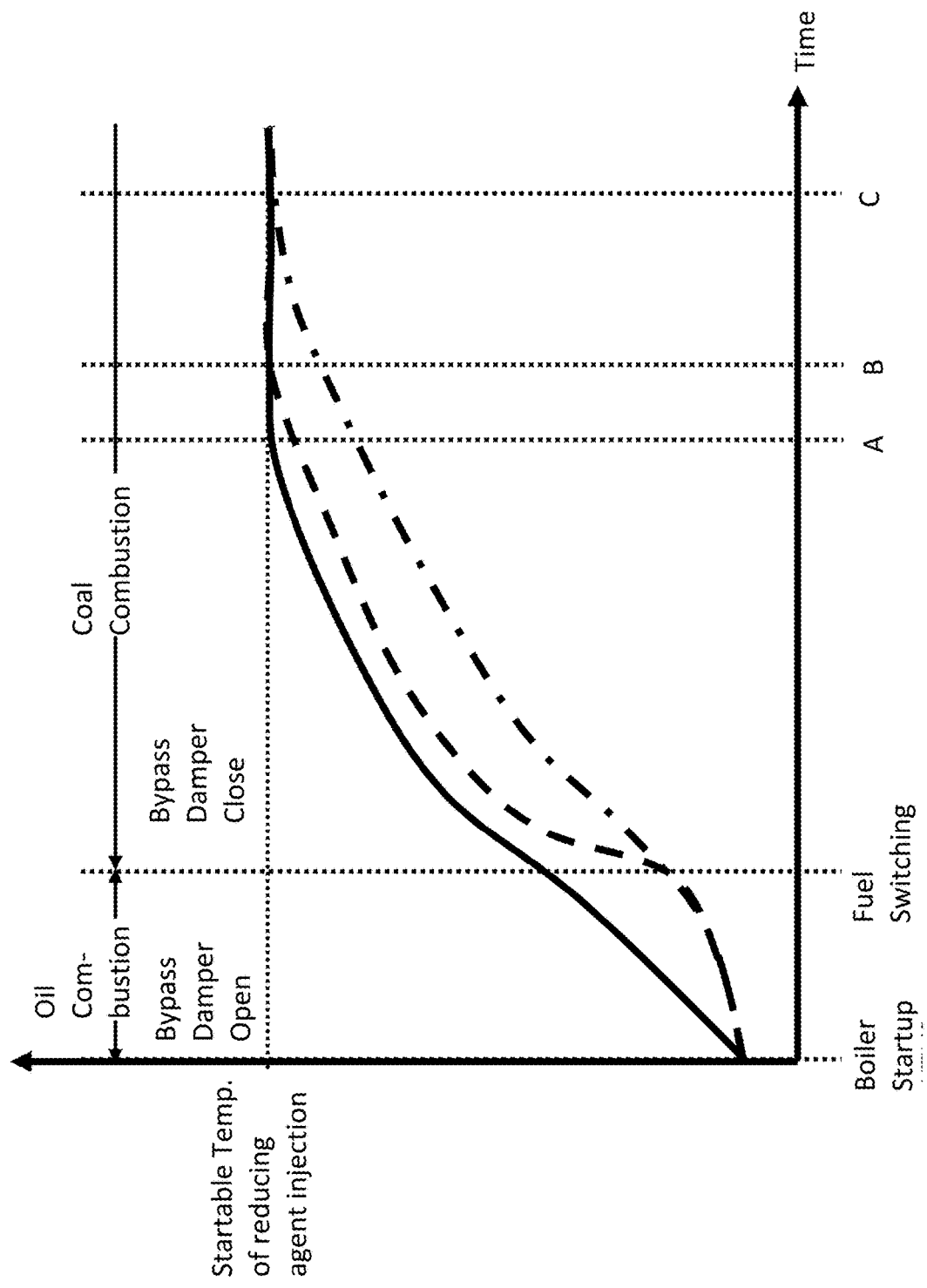
FIG. 2 is a graph which shows an example of changes in temperature of catalytic layers after the boiler startup.

The solid line in FIG. 2 shows an example of changes in temperature of catalytic layers when the operation method of the present invention was carried out in the flue gas purification system shown in FIG. 1. The temperature of catalytic layers was increased at an almost constant rate from the temperature at the boiler startup to the temperature which injection of a reducing agent can be started at. Even when closing the bypass damper after switching fuels (after about 200 minutes of the boiler startup), the rate of temperature increase of catalytic layers was not rapidly changed. Time (A) for the catalytic layers to reach a temperature at which injection of ammonia can be started was about 800 minutes after the boiler startup.

Comparative Example 1

The dashed line in FIG. 2 shows changes in temperature of catalytic layers when the following operation method was carried out in the flue gas purification system shown in FIG. 1. First, the boiler was started by oil combustion with the inlet damper 2 of the denitration equipment and the outlet damper 7 of the denitration equipment were closed and the bypass damper 4 was opened. Next, the bypass damper was closed after switching fuels (after about 200 minutes of the boiler startup), and the inlet damper 2 of the denitration equipment and the outlet damper 7 of the denitration equipment were also opened at the same time.

Shortly after the startup, the temperature of catalytic layers was slightly increased due to heat conduction in e.g. a duct. After switching fuels (after about 200 minutes of the boiler startup), closing of the bypass damper 4, and openings of the inlet damper 2 of the denitration equipment and the outlet damper 7 of the denitration equipment at the same time leaded to rapid increasing of the temperature of catalytic layers due to heat transfer (by convection) from flue gas. At this time, a large difference in temperature (heat shock) in each part of the denitration equipment was made. Time (B) for the catalytic layers to reach a temperature at which injection of ammonia can be started was about 900 minutes after the boiler startup.

Comparative Example 2

The dash-dot-dash line in FIG. 2 shows changes in temperature of catalytic layers when the following operation method was carried out in the flue gas purification system shown in FIG. 1. First, the boiler was started by oil combustion with the bypass damper 4 was opened and the inlet damper 2 of the denitration equipment and the outlet damper 7 of the denitration equipment were closed. Next, the bypass damper was gradually closed after switching fuels (after about 200 minutes of the boiler startup), and the inlet damper 2 of the denitration equipment and the outlet damper 7 of the denitration equipment were also gradually opened at the same time.

Shortly after the startup, the temperature of catalytic layers was slightly increased due to heat conduction in e.g. a duct. After switching fuels (after about 200 minutes of the boiler startup), the bypass damper 4 was gradually closed over 200 minutes, and the inlet damper 2 of the denitration equipment and the outlet damper 7 of the denitration equipment were gradually opened simultaneously over 200 minutes, the temperature of the catalytic layers was increased at a constant rate. Time (C) for the catalytic layers to reach a temperature at which injection of ammonia can be started was about 1200 minutes after the boiler startup.

EXPLANATION OF REFERENCES

1: Boiler
2: Inlet damper of denitration equipment
3: Reducing agent injector
4: Bypass damper
5: Catalytic reactor
6: Catalytic layer
7: Outlet damper of denitration equipment
8: Air preheater
9: Induced draft fan
10: Stack
11: Bypass flue
12: Inlet flue
13: Outlet flue
14: Furnace

The invention claimed is:

1. A method for start-operating a flue gas purification system equipped with a boiler which can burn oil fuel and coal fuel either in combination or switching therebetween, a denitration equipment having a reducing agent injector and a catalytic reactor, an inlet flue to guide flue gas discharged from the boiler to the denitration equipment, an outlet flue to guide flue gas discharged from the denitration equipment, a bypass flue which can guide flue gas from the inlet flue to the outlet flue so as to bypass the denitration equipment, and a bypass damper, comprising:

in the flue gas purification system,
opening the bypass damper and burning oil fuel in the boiler which is in condition not yet suitable for coal combustion, to allow the flue gas discharged from the boiler to dividedly flow to the denitration equipment and the bypass flue, whereby deterioration of a denitration catalyst in the catalytic reactor due to unburned components in the flue gas is suppressed and a temperature of the catalytic reactor is raised,
switching the oil fuel to coal fuel, when the boiler is in condition suitable for coal combustion, to burn the coal fuel in the boiler,
closing the bypass damper after switching the oil fuel to the coal fuel, and then
injecting a reducing agent when the catalytic reactor is in condition suitable for a denitration reaction.

2. The method according to claim 1, wherein the bypass damper is driven by a pneumatic actuator.

3. The method according to claim 1, wherein the bypass damper is an on-off control damper.

4. The method according to claim 1, wherein a proportion of the flue gas dividedly flowing to the denitration equipment and the bypass flue is 5:95 to 40:60.

5. The method according to claim 1, wherein the injection of the reducing agent is started when the catalytic reactor reaches in condition suitable for the denitration reaction.

6. The method according to claim 1, wherein the closing of the bypass damper is to flow the flue gas to practically only the denitration equipment.

7. The method according to claim 1, wherein the reducing agent is not injected when the catalytic reactor is not in condition suitable for the denitration reaction.

\* \* \* \* \*